United States Patent Office 3,098,811
Patented July 23, 1963

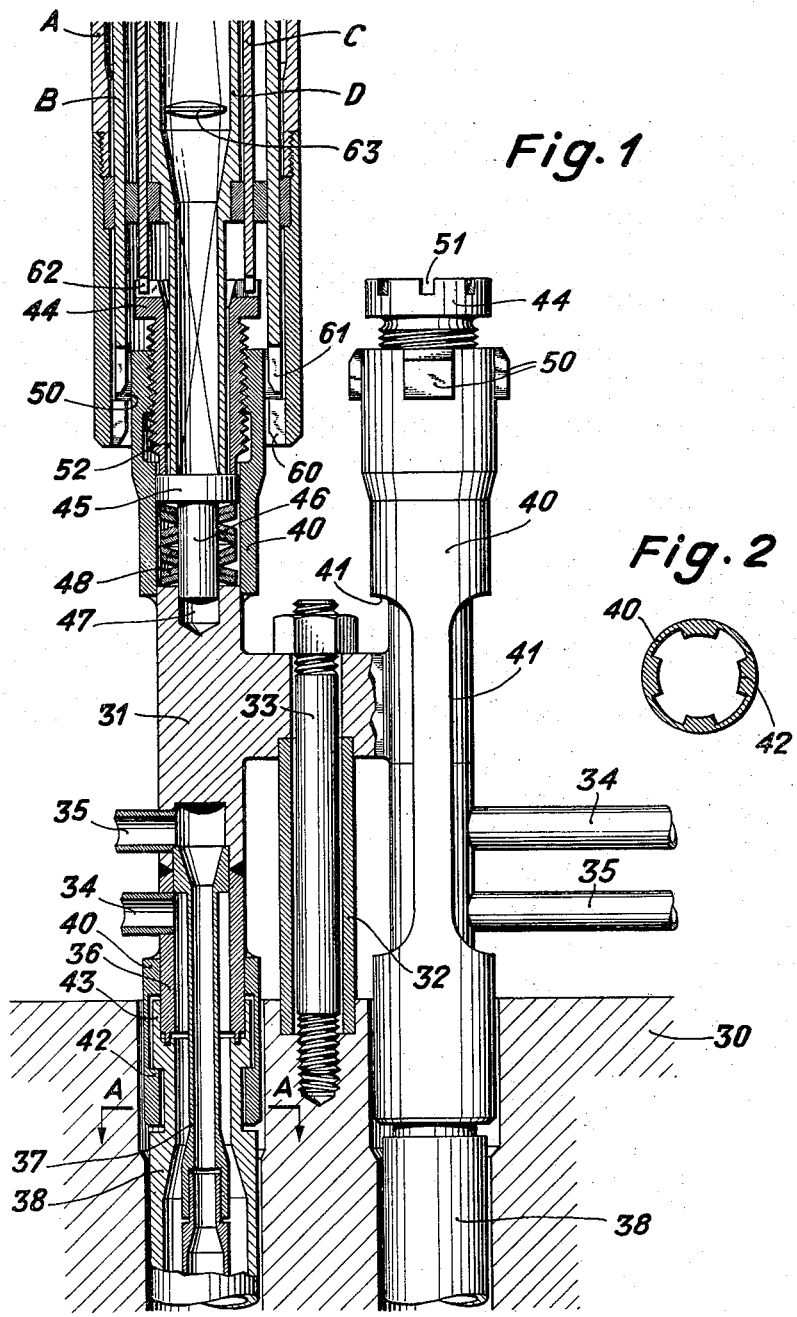

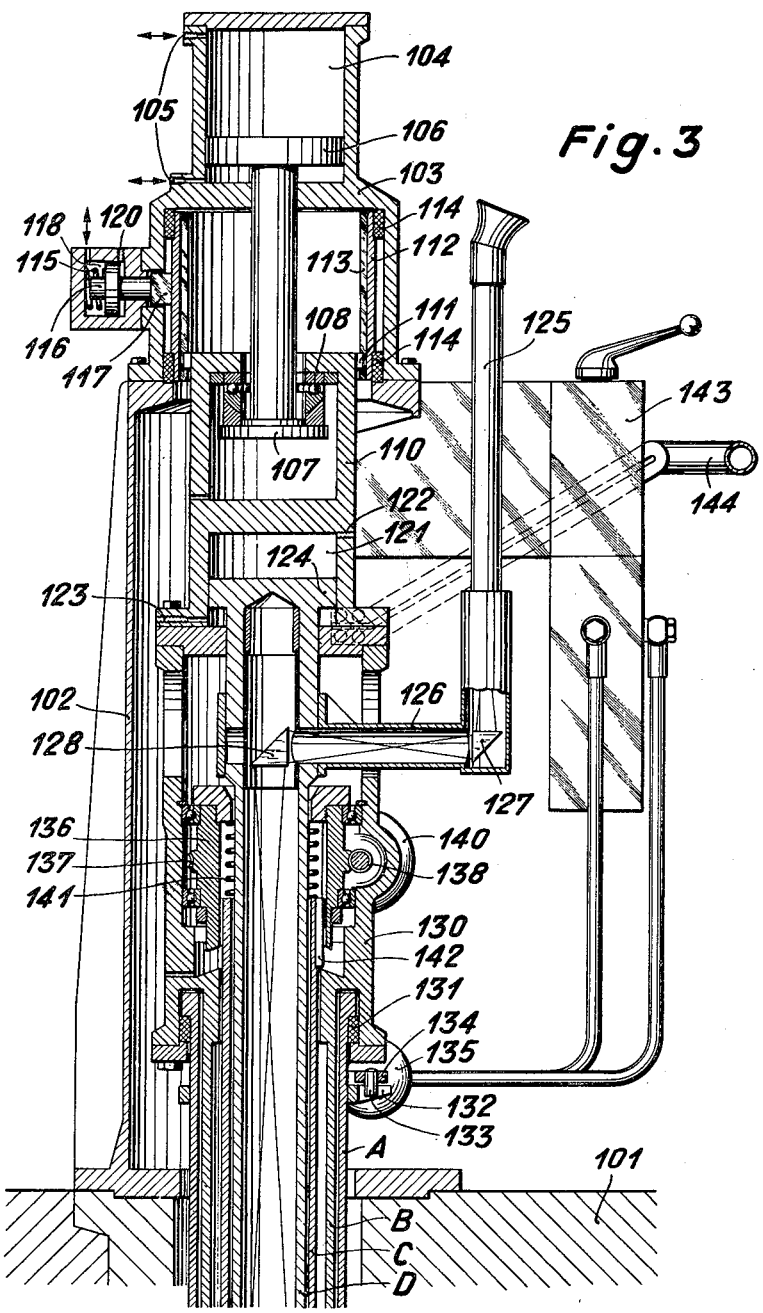

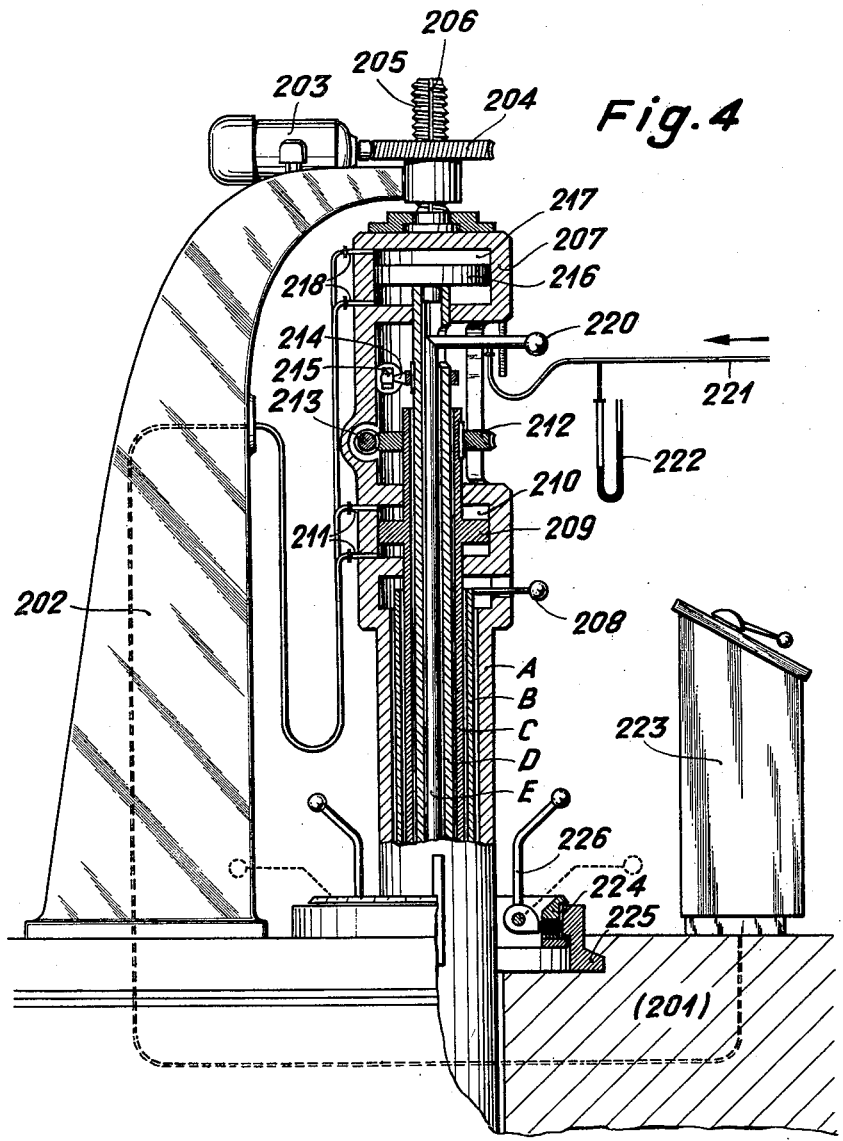

3,098,811
MANIPULATORS FOR REPLACING FUEL UNITS IN A NUCLEAR REACTOR
Eugen Guidi, Winterthur, Switzerland, assignor to Sulzer Freres, S.A., Winterthur, Switzerland, a corporation of Switzerland
Filed May 26, 1961, Ser. No. 112,877
Claims priority, application Switzerland June 8, 1960
7 Claims. (Cl. 204—193.2)

The invention relates to a manipulator for replacing fuel units forming part of a nuclear reactor and including rodlike parts containing fissionable material and means for conducting a coolant in heat exchange relation with said rodlike parts, a securing device including connections for coolant supply and relief pipes being provided for each fuel unit or group of fuel units for securing the fuel units to the moderator part of the reactor.

The present application is a continuation-in-part application of my application Serial No. 112,876, filed on the same day as the present application and relating to means for securing fuel units in a nuclear reactor.

Nuclear reactors have been proposed wherein the means for securing the fuel units and for connecting supply and relief pipes for the coolant to the fuel units are placed at one side of the moderator unit and removal of spent fuel rods and insertion of new fuel rods is effected at the opposite side of the moderator part of the reactor.

It is an object of the invention to provide a simple and reliable handling device or manipulator for connecting fuel units to and disconnecting fuel units from a device for securing the fuel units in the moderator part of a nuclear reactor. The manipulator is particularly adapted to operate securing devices of the type wherein the fuel unit is pressed against a stationary part mounted on the moderator unit, the pressure being produced by elastic means interposed between the stationary part and a locking part movable relatively thereto in the direction of the longitudinal axis of the fuel unit. The movable part is fixed to the stationary part in a position wherein said elastic means produces the desired pressure. The fuel unit can be released or unlocked from the stationary part upon movement of the movable part to a position wherein the elastic means is fully expanded. The stationary part preferably has a cylindrical portion coaxial of the fuel unit and extending into the movable part. A securing device of this type is shown in my copending application of which the present application is a continuation-in-part application. The manipulator according to the invention has at least two preferably coaxial tubular elements which are axially movable relatively to each other. One end of one of the tubular elements is provided with means to engage the movable part and one end of a second tubular element is adapted to act on the elastic means of the securing device. The securing device and the ends of the tubular elements adapted to be engaged therewith are located at one side of a radiation shield or biological screen. The tubular elements extend through the radiation shield and are adapted to be manipulated at the ends which are located on the opposite side of the radiation shield.

The manipulator or handling device according to the invention forms a self-contained unit which can be transported from one securing device to another, wherever a fuel unit must be replaced.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a longitudinal part-sectional view of one end portion of a manipulator according to the invention.

FIG. 2 is a cross-sectional view of a part of the manipulator shown in FIG. 1, the section being made along line A—A of FIG. 1.

FIG. 3 is a longitudinal part-sectional view of the opposite end of the manipulator shown in FIG. 1.

FIG. 4 is a diagrammatic part-sectional elevation of a modified manipulator according to the invention.

Referring more particularly to FIGS. 1 and 2 of the drawing, numeral 31 designates an H-shaped support which is mounted on a moderator part 30 of a nuclear reactor by means of a bolt 33 and a spacer tube 32. The support has two vertical portions to each of which pipes 34 and 35 are connected for supplying and relieving a coolant. Each of the lower ends of the vertical portions of the support 31 includes parts 36 and 37 for connecting a fuel unit 38. The two vertical portions of the support 31 are cylindrical, each portion being surrounded by a sleeve element 40 having cutouts 41 through which the pipes 34 and 35 extend and which permit a limited rotation of the sleeves on the support 31. The lower ends of the sleeves 40 are provided with inward protuberances 42 cooperating with corresponding outward protuberances 43 at the upper end of the fuel unit 38 and forming a bayonet connection. Mushroomlike elements 45 are axially slidable in the upper ends of the sleeves 40 above the top of the support 31. The trunks 46 of the elements 45 extend into bores 47 in the top of the support 31. The trunks 46 are surrounded by cup springs 48. Threaded plugs 44 provided with axial bores 52 are screwed into the top ends of the sleeves 40 to abut against the elements 45. The plugs 44 have heads provided with radial slots 51 on top thereof. The top ends of the sleeves 40 are provided with outward protuberances 50 for rotating the sleeves 40 by a suitable tool.

The device illustrated in FIG. 1 is shown in position for retaining two fuel elements in the moderator part 30. The inward protuberances 42 of the sleeves 40 axially press against the outward protuberances 43 of the fuel units 38 whereby the latter are pressed against the stationary support 36. The pressure abuttingly pressing the fuel elements against the support 36 corresponds to the initial tension of the springs 48 which is adjusted by the plugs 44. If it is desired to release a fuel unit, the respective element 45 is pressed down against the action of the spring 48. This releases the pressure operative between the abutting end faces of the protuberances 42 and 43 so that the respective sleeve 40 can be turned by a tool engaging the protuberances 50 until the protuberances 42 are axially aligned with the gaps between the protuberances 43 and the respective fuel unit can be moved downward and removed from the moderator. It is advisable to simultaneously stay the sleeve 40 by a force which acts upon the protuberances 50 in a direction which is opposite to the direction of the force acting on the element or plunger 45. The new fuel unit is introduced upwardly into the reactor and engaged with the lower end 36 of the support 31 whereupon the sleeve 40 is turned to effect axial engagement of the projections 42 with the projections 43. The plunger 45 is subjected to the pressure which is required to be operative between the elements 38 and the end 36. To maintain this pressure the threaded plug 44 is turned until it abuts the depressed plunger 45, whereafter the force acting upon the plunger 45 can cease.

The tool part of the handling device according to the invention can be seen in the top part of FIG. 1 and comprises telescopic tubes A, B, C, D having ends adapted to cooperate with the securing device. Tube A has inward projections 60 cooperating with the sleeve projections 50 in bayonet joint fashion. The lower end of the tube B is provided with axial claws 61 which fit into gaps between the protuberances 50 for turning the sleeve 40 upon rotation of the tube B. The lower end of the tube C is provided with axial claws 62 adapted to be inserted into the slots 51 of the plug 44 for turning the latter upon rotation of the tube C. The lower end of the tube D has a smaller diameter than the bore 52 and is adapted to apply pressure to the plunger 45. Inside tube D is an optical system including a lens 63 and affording inspection of tube D relative to the position of the bore 52 and to the plunger 45. The latter may be provided with marks indicating the center of the plunger and identifying the fuel unit with which the securing device is associated.

FIG. 3 illustrates the upper part of the handling device. A frame 102 is secured to cover 101 which can move above the reactor and which forms a biological radiation screen. The frame 102 supports a casing 103 including a cylinder 104 provided with ports 105 for a pressure fluid. A piston 106 movable in the cylinder 104 is connected to a piston rod provided at its other end with a circular plate 107. Bearing thereagainst is a ball bearing 108 supporting a casing 110 having at its top end radial projections 111 engaging in axial slots 113 at the inside of a tubular bush 112 rotatably mounted in rings 114. A brake shoe 117 is pressed against the outside of the bush 112 by a spring 115 which acts upon an element 116 including a piston movable in a cylinder 118. The latter has ports 120 for supplying and relieving a pressure fluid. The lower part of the casing 110 is formed as a cylinder 121 having pressure fluid ports 122, 123. A piston 124 movable in the cylinder 121 is connected to the innermost tube D containing an optical telescope system comprising tubes 125, 126, prisms 127, 128 and other optical elements, not shown, and a lighting device, not shown, for observing the objects near the end of the tube D and orienting the handling device with respect to the securing devices. Secured to the bottom of the casing 110 is a casing 130 which merges at the bottom into the tube B. The tube A which slides over the tube B is rotatable in bearing rings 131. An arm formed with a slot 132 extends radially from the tube A, the slot receiving a stud 133 connected to a piston rod 134 of a servomotor 135. A bush 136 provided with a worm toothing 137 is rotatably mounted in the casing 130. Engaging with the toothing 137 is a worm 138 operated by a servomotor 40. The tube C is axially movable in the bush 136. A spring 141 permanently presses the tube C against an abutment in the casing 130, and a key 142 prevents rotation of the tube C relative to the bush 136. The servomotors 135, 140 and the supply of pressure medium to the cylinders 104, 118, 121 are controlled from a control panel 143. The casing 110 can be rotated, together with its tubes, A, B, C, D, by a handle 144 secured to the casing 110.

All the tubes A, B, C, D are raised or lowered by selective admission and relief of a pressure fluid to and from the spaces above and below the piston 106 in the cylinder 104. The position of the handling device relative to the fuel elements or to the securing devices can be observed by the optical system provided in tubes 125, 126 and D. To replace a fuel element the handling device is shifted horizontally, for instance, by movement together with the cover 101, until the tube D reaches a position above the particular securing device which it is required to operate. The tube B is then so rotated by means of the handle 144 that the claws 61 of the tube B are in line with the gaps between the projections 50 of the sleeve 40. Thereupon the piston 106, casing 110 and tubes A, B, C, D are lowered whereby the tube D is received in the bore 52 in the plug 44. Tube A is retained by the servomotor 135 in a position in which the projections 60 of the tube A pass by the projections 50 of the sleeve 40 whereupon the tube A is rotated by the servomotor 135 so that the projections 50, 60 engage with one another. The claws 61 have simultaneously engaged with the projections 50 and the claws 62 have engaged with the slots 51 of the plug 44. The cylinder 121 is operated to produce a force between tube D and tube B whereby the plunger 45 is pressed downward to relieve the pressure operative between the fuel element 38 and the securing device. Tube C is operated to loosen the threaded plug 44 whereby the spring 48 is relieved so that the pressure fluid supply to the cylinder 121 can be stopped. The sleeve 40 descends and the connection between the fuel unit and the securing device is released. Should the packing interposed between fuel unit and the securing device cause the parts to stick together, the plug 44 is turned further and the sleeve 40 lowered until its bottom end abuts the fuel unit. The weight of the handling device acting through the tube B upon the sleeve 40 causes the desired separation. Tube B is then rotated by means of the handle 144 to turn the sleeve 40 so as to disengage the projections 42 from the projections 43. The fuel unit 38 can be removed from the moderator by a suitable apparatus standing ready below the moderator. A new fuel unit is introduced upward to the moderator by the aforementioned apparatus and moved into engagement with the securing device 31, whereupon the sleeve 40 is appropriately rotated by means of the tubes A and B to engage the bayonet connection formed by the projections 42 and 43. The cylinder 121 is operated to depress the plunger 45 and the fuel unit 38 is pressed against the end portion 36 of the support 31 at the pressure which is accurately controlled by the adjustable pressure in the cylinder 121. The plug 44 is now screwed in, rotating the tube C by means of the servomotor 140 until the plug abuts against the plunger 45 without appreciable pressure. For this purpose the servomotor 140 is preferably provided with a torque-limiting coupling, not shown. After appropriate rotation of the tube A the handling device can be raised by the piston 106 in the cylinder 104 and moved away.

FIG. 4 illustrates a simplified form of the handling device according to the invention whose lower part is the same as in the embodiment hereinbefore described except for the optical system. Secured to an anti-radiation cover 201 is a frame 202 rotatably supporting a nut formed in a worm wheel 204 which can be rotated by means of a servomotor 203. The nut cooperates with a screw 205 which is secured against rotation by a keyway 206 and a corresponding key, not shown. Suspended on the screw 205 is a casing 207 the bottom part of which forms tube A. Mounted therein is tube B having a handle 208 which extends to the outside of the device. Disposed in the tube B is the tube C on which is formed a piston 209 moving in a cylinder 210 formed in the casing 207. The cylinder 210 has ports 211. The top portion of the tube C is axially movable in a worm wheel 212 and prevented to rotate relative to the wheel 212 by a key, a worm 213 adapted to be rotated by a servomotor, not shown, engaging with the worm wheel 212. Disposed in tube C is tube D provided with an arm 214 engaged by a piston rod of a servomotor 215. A piston 216 moving in a cylinder 217 in the casing 207 is connected to the top of the tube D. The cylinder 217 is provided with ports 218. In contradistinction to the embodiment shown in FIGS. 1 to 3 a tube E is disposed inside the tube D, the tube E being provided with a hollow handle 220 which is connected to a pipe 221 conducting air at a slight positive pressure which is indicated by a pressure gauge 222. The supply of a pressure fluid to the pipes 211, 218 and the operation of the servomotor driving the worm wheel 212 and the servomotor 215 are controlled from a control panel 223. Coaxially connected to the tube A is a ring 224 which is rotatable in a ring 225 in the cover 201, a locking mechanism 226 being provided for preventing rotation of the ring 224 in the ring 225.

In the embodiment shown in FIG. 4, the handling device is centered over a securing device by means of the tube E acting as pneumatic orientation means. When tube E is above the plug 44 of a securing device, air cannot flow out of the pipe E and the pressure indicated by the gauge 222 is at a maximum. The servomotor 203 is then operated to engage the handling device with the securing device. After the locking device 226 has been released, the handle thereof can be used to turn the tube A and the casing 207 until the projections 60 engage with the securing device as hereinbefore described. The sleeve 40 is rotated by rotating the tube B, using the handle 208. Pressure is now applied to the plunger 45 by the tube D which is pressed downward relative to the tube A which holds the sleeve 40, by admitting a pressure fluid to the space in the cylinder 217 above the piston 216. The piston 209 in the cylinder 110 raises or lowers tube C while the plug 44 is rotated by the servomotor associated with the worm 213.

I claim:

1. In a nuclear reactor having a moderator part, a plurality of oblong fuel units disposed in said moderator part, each fuel unit including a rodlike part containing fissionable material, means for conducting a coolant in heat exchange relation with said rodlike part, and a securing device operatively connected to each of said fuel units for securing the respective fuel unit to said moderator part, said securing device including a support connected to said moderator part and locking means movably connected to said support for locking the fuel unit to said support and including pipe connections for supplying a coolant to and relieving the coolant from said coolant conducting means: a handling device for locking said locking means to and unlocking said locking means from said support, said handling device being adapted to be selectively moved to one of said securing devices and including a plurality of coaxial, relatively movable tubes individually having end portions adapted to be temporarily engaged with said locking means and having second end portions adapted to be manipulated for moving said tubes to actuate said locking means, and a radiation shield interposed between said end portions for biologically screening said second end portions from said first end portions.

2. In a nuclear reactor as defined in claim 1, means for relatively movably interconnecting said tubes, a frame, and suspension means interconnecting said handling device and said frame for suspending said handling device from said frame.

3. In a nuclear reactor according to claim 2 and wherein said suspension means includes a cylinder connected to said frame, a piston movable in said cylinder and connected to said handling device, and controllable conduit means connected to said cylinder for supplying a pressure fluid to and relieving a pressure fluid from said cylinder for moving said piston.

4. In a nuclear reactor according to claim 2 and wherein said suspension means includes a screw connection for moving said handling device relatively to said frame.

5. In a nuclear reactor as defined in claim 1, orientation means associated with the innermost of said tubes for determining the position of said handling device relative to said securing devices.

6. In a nuclear reactor as defined in claim 5 wherein said orientation means includes a telescope.

7. In a nuclear reactor as defined in claim 5 wherein said orientation means includes a feeler means adapted to feel said securing devices.

No references cited.